March 21, 1944.  I. F. SNYDER  2,344,569
COAL TRUCK BODY CONSTRUCTION
Filed Feb. 22, 1943 2 Sheets-Sheet 1
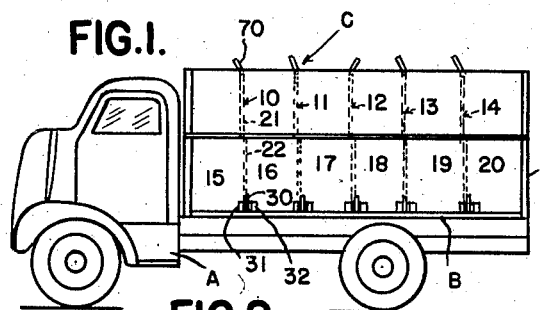
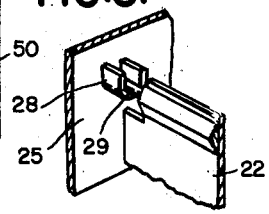
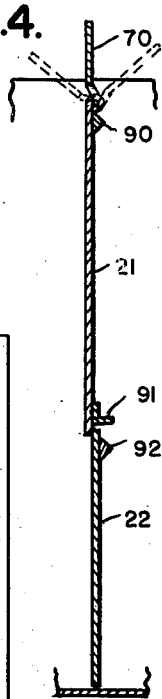
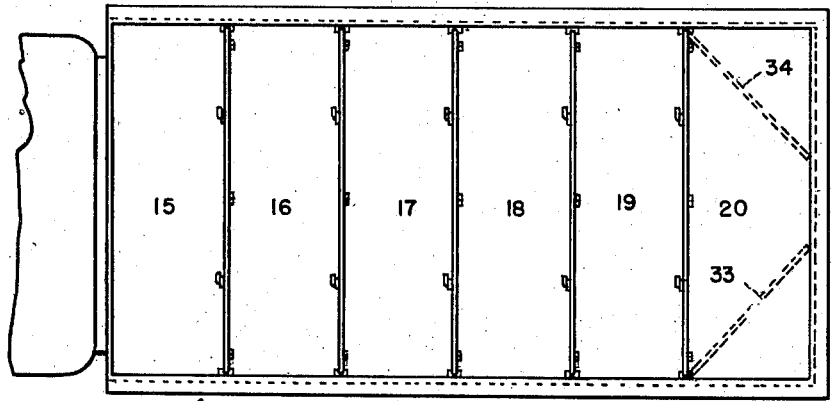
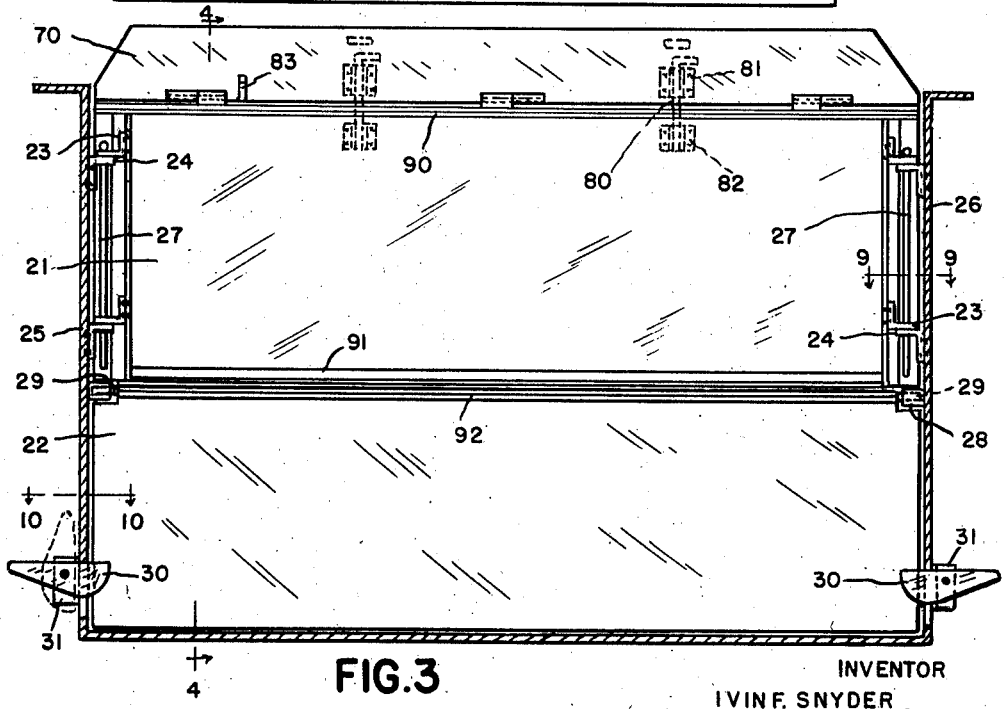
INVENTOR
IVIN F. SNYDER
ATTORNEYS March 21, 1944.    I. F. SNYDER    2,344,569
COAL TRUCK BODY CONSTRUCTION
Filed Feb. 22, 1943    2 Sheets-Sheet 2
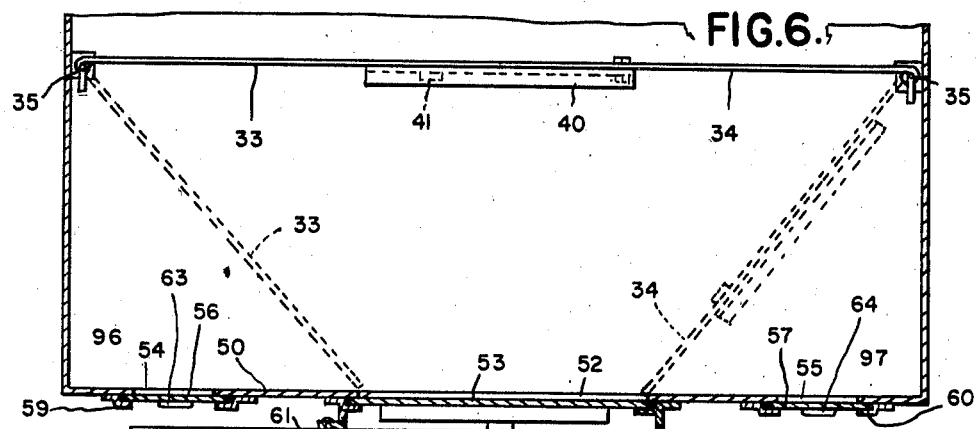
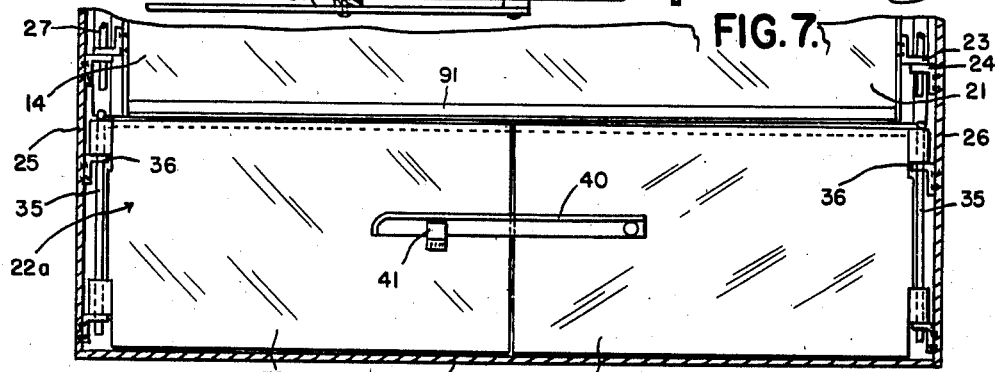
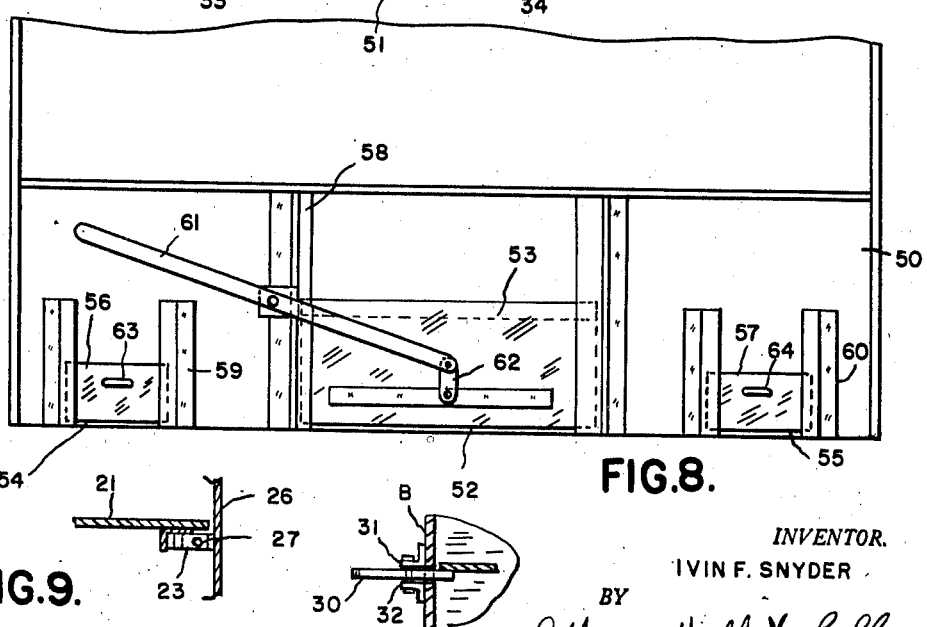
INVENTOR.
IVIN F. SNYDER
BY
Whittemore Hulbert + Belknap
ATTORNEYS Patented Mar. 21, 1944

2,344,569

UNITED STATES PATENT OFFICE 2,344,569

COAL TRUCK BODY CONSTRUCTION

Ivin F. Snyder, Detroit, Mich., assignor to Clifford H. McCurdy, Detroit, Mich.

Application February 22, 1943, Serial No. 476,707

14 Claims. (Cl. 298—8)

This invention relates generally to partition structures and refers more particularly to partition assemblies for dump trucks adapted to haul loose material such as coal, gravel, sand and the like.

One of the essential objects of the invention is to provide the body of a dump truck with upright partitions that cooperate with the walls of the truck body to provide compartments for the loose material and include horizontally hinged sections that may swing rearwardly to facilitate the unloading of the material from the truck.

Another object is to provide the truck body with a tail gate having a centrally located door controlled main discharge opening through which the material may travel when being unloaded, and having upon opposite sides of said central opening auxiliary door controlled openings through which material in opposite side corners of the rearmost compartment of the truck body may travel when being unloaded.

Another object is to provide a partition structure of the type mentioned wherein one or more of the partitions, preferably the rearmost one, has vertically hinged sections adapted, after the rearmost compartment has been emptied, to swing rearwardly therein against portions of the tail gate at opposite sides of the central discharge opening therein so that the material being unloaded from the preceding compartments will be directed to the main discharge opening and thereby will be effectively prevented from lodging or collecting in the opposite side corners of the rearmost compartment.

Another object is to provide a partition structure wherein suitable means, preferably in the form of manually operable latches, are provided to normally hold the horizontally hinged sections of the partitions from swinging rearwardly as aforesaid, and are accessible and adapted to be conveniently operated from the outer sides of the truck body to release said sections for unloading purposes.

Another object is to provide a partition assembly wherein the partitions, including the hinged sections thereof, are individually removable to vary the size of the compartments.

Another object is to provide a partition structure wherein suitable means, preferably in the form of a manually operable latch, is employed to normally hold the vertically hinged sections of the rearmost partition from swinging rearwardly as aforesaid and is accessible and adapted to be operated from the rear end of the truck body to release said sections for unloading purposes.

Another object is to provide a partition structure that is simple in construction, economical to manufacture, easy to install and efficient in operation.

Other objects, advantages and novel details of construction of this invention will be made more apparent as this description proceeds, especially when considered in connection with the accompanying drawings, wherein:

Figure 1 is a side elevation of a truck having a partition structure embodying my invention;

Figure 2 is a fragmentary top plan view of the truck and showing the partition structure therein, the rearmost partition being shown in both full and dotted line positions;

Figure 3 is a vertical cross sectional view through the truck body;

Figure 4 is a sectional view taken on the line 4—4 of Figure 3;

Figure 5 is a fragmentary perspective view of the hinge mounting for one of the lower sections of the partitions;

Figure 6 is a fragmentary horizontal sectional view through the truck, showing the rearmost partition in closed and open positions;

Figure 7 is a fragmentary vertical sectional view through the truck and showing the rearmost partition in closed position;

Figure 8 is a fragmentary rear elevational view of the truck, showing the tail gate and associated parts;

Figure 9 is a sectional view taken substantially on the line 9—9 of Figure 3;

Figure 10 is a sectional view taken substantially on the line 10—10 of Figure 3.

Referring now to the drawings, A is a dump truck having a conventional open top tiltable body B for hauling loose material such as coal, gravel, sand and the like, and C is a partition structure embodying my invention within said body.

As shown, there are five upright partitions 10, 11, 12, 13 and 14, respectively, within the body B, however any suitable number may be employed as desired. Preferably the partitions extend transversely of the body B at longitudinally spaced points thereof and cooperate with the walls of said body to provide a series of compartments 15, 16, 17, 18, 19 and 20, respectively, for the reception of the loose material mentioned.

All of the partitions are detachably mounted within the body B, and preferably all but the rearmost partition 14 are alike in construction so as to be interchangeable. However it is apparent that all of the partitions may be like the rearmost partition 14 if such an arrangement instead of the one shown is desired. Thus, the partitions may be individually inserted and removed to vary the size of the respective compartments.

In the present instance the partitions have upper and lower sections 21 and 22, respectively, that may be separately mounted in any suitable manner within the truck body. Preferably the upper section 21 of each partition is provided at opposite ends thereof with vertically spaced angle irons 23 which rest upon similarly spaced angle irons 24 fixed to opposite side walls 25 and 26, respectively, of the truck body B, and are held in place by inverted L-shaped rods 27 that extend vertically through aligned holes in said angle irons 23 and 24.

The lower section 22 of each partition, except the rearmost partition 14, is a solid one-piece panel substantially equal in length to the width of the body B and is hingedly suspended from U-shaped brackets 28 rigid with opposite sides 25 and 26 of the truck body. Preferably, short horizontal pintles 29 project endwise from the sections 22 and engage the base of the U-shaped brackets 28. Manually operable latches 30 pivoted between angle irons 31 and 32, respectively, upon the outside of the side walls 25 and 26 are employed to normally hold the sections 22 from swinging rearwardly.

The lower section 22a of the rearmost partition 14 has two parts 33 and 34, respectively, that swing horizontally about vertical pivots 35 detachably engaging angle irons 36 rigid with opposite sides 25 and 26 of the truck body. An arm 40 pivoted at one end upon the part 34 is engageable with a bracket 41 on the other part 33 to hold both parts in fully closed position, as illustrated in Figures 6 and 7. As pointed out above each of the partitions 10 to 13, inclusive, may be constructed like the rearmost partition 14, and thus each of them may have horizontally swinging parts such as 33 and 34, respectively. Moreover, instead of having upper and lower sections such as 21, 22 and 22a, respectively, the partitions 10 to 14, inclusive, may be solid one-piece members from top to bottom thereof but divided vertically at the center so that the portions upon opposite sides of the vertical division line thereof may swing horizontally like the parts 33 and 34.

The tail gate 50 of the truck body may be integral with or separate from and detachably secured to the side and bottom walls 25, 26 and 51, respectively, of the body. In either instance, such tail gate 50 has a centrally disposed main discharge opening 52 normally closed by a vertically slidable door 53, and preferably has upon opposite sides of said opening 52 smaller auxiliary openings 54 and 55, respectively, normally closed by vertically sliding doors 56 and 57, respectively. One set 58 of spaced guideways is provided on the tail gate 50 for the main door, while separate sets 59 and 60, respectively, of spaced guideways are provided on the tail gate for the doors 56 and 57. Any suitable means such as the pivoted lever 61 and link 62 may be employed for raising the door 53, while any suitable means such as the handles 63 and 64 may be used to raise the doors 56 and 57. If desired, the openings 54 and 55 and doors 56 and 57 therefor may be eliminated in which event only the opening 52 and door 53 therefor would be provided.

Hingedly mounted at the upper edges of the upper sections 21 of the respective partitions are upwardly extending flaps 70 which may be swung or tilted either forwardly or rearwardly relative thereto from an upright position substantially in vertical alignment with the partitions to upwardly inclined positions upon opposite sides thereof to form funnels to facilitate loading of the compartments. Any suitable means such as the inverted L-shaped rods 80 detachably engaging brackets 81 and 82, respectively, on the flaps 70 and partition sections 21 may be employed to hold the flaps 70 in an upright position, while lugs 83 may be mounted on opposite sides of the flaps 70 at the lower edges thereof for engagement with opposite sides of the partition sections 21 to hold the flaps 70 in their upwardly inclined positions. These flaps 70 and associated parts are embodied in a companion application of Clifford H. McCurdy filed under even date herewith.

In order that relatively light gauge sheet metal may suffice in the construction of the partitions, the upper sections 21 thereof are preferably provided adjacent their upper and lower edges with reinforcing or stiffening bars 90 and 91, and the lower sections 22 have reinforcing and stiffening bars 92 at their upper edges. Preferably the upper bars 90 and 92 on the sections 21 and 22 are solid and substantially triangular shape in cross section, while the lower bars 91 on the upper sections 21 are angle irons. However, bars of any suitable configuration may be employed.

In use, the compartments 15, 16, 17, 18, 19 and 20, respectively, may be filled in any suitable order desired with loose material such as coal, gravel, sand and the like. For example, they may be filled in sequence from front to rear of the truck or vice versa, or any one or more of the compartments may be filled while the others may be left empty. In all cases, however, the flaps 70 at the upper edges of one compartment to be filled are swung to the upwardly diverging or inclined positions to form a funnel to facilitate the loading of such compartment. Thus, a comparatively narrow compartment may be expeditiously filled without likelihood of the material spilling over into an adjacent compartment. After one compartment has been filled then the flaps 70 at the upper edges of the next compartment to be filled are swung to the inclined positions mentioned to direct the material into that compartment.

When the compartments are fully loaded or when the truck is ready to make a delivery of its load, the flaps may be moved to and locked in the upright position mentioned. Consequently there will be no overflow of the load in one compartment into another when the truck body B is tilted in the customary manner for unloading purposes. This is especially important when different types or grades of coal or other materials are carried in the respective compartments, and it is desired to keep them separate. It is also important when loads for different destinations are carried by the respective compartments.

When the truck body B is tilted for unloading purposes, the door 53 for the main discharge opening 52 in the tail gate 50 may be raised to permit the contents of the rearmost compartment 50 to be discharged. Then the doors 56 and 57 for the auxiliary openings 54 and 55 are raised to permit the material in opposite side corners of the rearmost compartment 20 to be discharged. The doors 56 and 57 are then closed and the center door 53 is left open or regulated as desired by the lever 61 to control the flow of material from the other compartments. Preferably this is accomplished by first unlatching the two parts 33 and 34, respectively, of the rearmost partition section 22a so that such parts may swing rearwardly from the full to the dotted line positions illustrated in Figures 2 and 6 against the tail gate at opposite sides of the main opening 52.

Thus, the parts 33 and 34 cooperate with the floor or bottom of the truck body to form a funnel to direct the material from the preceding compartment 19 to the outlet opening 52. Such parts 33 and 34 will then prevent the material reaching or collecting in the opposite side corners 96 and 97 of the rearmost compartment 20. After the parts 33 and 34 are in their rearward inclined position, the latches 30 at opposite sides of the body may be manipulated to the dotted line position illustrated in Figure 3 to permit the lower section 22 of the preceding partition to swing rearwardly and to thereby permit the contents of the forward compartments to be successively discharged through the main outlet opening in the tail gate. In each instance the rearwardly inclined parts 33 and 34 of the partition section 22a will guide the material from the forward compartments to the main discharge opening 52 in the tail gate 50. Thus, it will be apparent that the doors 53, 56 and 57 on the tail gate 50 control the discharge of the contents of the rearmost compartment 20, the parts 33 and 34 of the partition section 22a being operable to guide the material from the preceding compartment 19 to the main discharge opening 52. However, if the forward partitions 10 to 13, inclusive, are like the rear partition as suggested above, then each of said partitions will function similar to the rear partition for directing or guiding the load discharged from successive compartments toward the center of the truck in longitudinal alignment with the main discharge opening 52. The lower sections 22 of the partitions 10, 11, 12 and 13, respectively, successively control the discharge of the contents from one compartment to another of the contents of the respective compartments until it is ultimately discharged through the main discharge opening 52 in the tail gate. However, if the partitions are solid from top to bottom thereof instead of divided horizontally into upper and lower sections, and are divided vertically instead, then the portions of such partitions upon opposite sides of the vertical division lines thereof may swing horizontally like the parts 33 and 34 to effect the discharge of the material carried in the respective compartments.

What I claim as my invention is:

1. An open top truck body having two adjacent compartments for loose material, a wall of one compartment having a discharge opening therein, and a wall intermediate and common to both compartments having relatively movable parts movable toward portions of the first mentioned wall at opposite sides of the discharge opening therein and operable when in such position to direct material from the second compartment through the first compartment to the discharge opening.

2. An open top truck body having two adjacent compartments for loose material, a wall of one compartment having a centrally disposed discharge opening therein, and a wall intermediate and common to both compartments having hingedly mounted sections engageable with the first mentioned wall at opposite sides of the discharge opening and operable when in such position to direct material from the second compartment through the first compartment to the discharge opening.

3. The combination with an open top truck body adapted to haul loose material, of a plurality of upright partitions within said body at spaced points thereof and cooperating with upright walls of the truck body to provide compartments for the reception of said material, one upright wall of the truck body having a discharge opening for the material in the compartment contiguous to said wall, and one of the partitions having relatively movable sections operable to direct material from another compartment through the compartment just mentioned to the discharge opening in said wall.

4. The combination with an open top truck body adapted to haul loose material, of a plurality of upright partitions within said body at spaced points thereof and cooperating with upright walls of the truck body to provide compartments for the reception of said material, one upright wall of the truck body having a discharge opening for the material in the compartment contiguous to said wall, and one of the partitions having hingedly mounted sections engageable with the wall just mentioned at opposite sides of the discharge opening and operable when in such position to direct material from another compartment through the compartment just mentioned to the discharge opening in said wall.

5. An open top truck body having three adjacent compartments for loose material, a wall of one compartment having a discharge opening through which material in all three compartments may travel, a wall of another compartment having relatively movable sections operable to direct material from the second mentioned compartment through the first mentioned compartment to the discharge opening, and a wall of the third compartment having a normally latched hinged portion for permitting material in the third compartment to enter the second compartment to be directed therefrom as aforesaid to the discharge opening.

6. An open top truck body having three substantially parallel compartments for loose material, a wall of one compartment remote to a second compartment having a discharge opening through which material in all three compartments may travel, a wall common to the first and second compartments but remote to a third compartment having relatively movable sections operable to direct material from the second compartment through the first compartment to the discharge opening, and a wall common to the second and third compartments having a portion operable to release material in the third compartment to the second compartment so that it may be directed from the second compartment as aforesaid to the discharge opening.

7. An open top truck body having a series of compartments arranged in a row and adapted to receive loose material, a wall of the compartment at one end of the row having a discharge opening, a wall of the compartment next to the first mentioned compartment having relatively movable sections operable to direct material from the second compartment through the first compartment to the discharge opening, and a wall of the compartment next to the second compartment having a relatively movable section operable to release material from the third compartment to the second compartment so that it may be directed by the relatively movable sections aforesaid from the second compartment to the discharge opening in the first compartment.

8. An open top truck body having a series of compartments arranged in a row and adapted to receive loose material, a wall of the compartment at one end of the row having a discharge opening, a wall common to the first compartment and to the compartment next to the first compartment having hingedly mounted sections engageable with the first wall at opposite sides of the discharge opening and operable to direct material from the second compartment through the first compartment to the discharge opening, and a wall common to the second compartment and the compartment next to the second compartment having a relatively movable section operable to release material from the third compartment to the second compartment so that it may be directed by the hingedly mounted sections aforesaid from the second compartment to the discharge opening in the first compartment.

9. The combination with an open top truck body, of a plurality of upright partitions within the body and cooperating with the walls of the body to provide a row of compartments for loose material, a wall of the compartment at one end of the row having a discharge opening, a partition common to the compartment at one end of the row and to the next compartment thereto having normally latched hingedly mounted sections operable when unlatched to move relative to each other toward the wall aforesaid for directing material to the discharge opening therein.

10. The combination with an open top truck body, of a plurality of upright partitions within the body and cooperating with the walls of the body to provide a row of compartments for loose material, each partition having separate upper and lower sections, the upper sections of all partitions being similar in construction and detachably mounted in the body, the lower section of one partition having normally latched hingedly mounted sections operable about upright pivots when unlatched to move relative to each other within an adjacent compartment to direct material from one compartment through said adjacent compartment to a discharge opening in a wall of the last mentioned compartment.

11. An open top elongated truck body having an end wall provided with a discharge opening, transversely extending partitions within the body at spaced points longitudinally thereof and dividing the same into a series of compartments, each partition having two sections arranged one above the other, the upper sections being relatively fixed but removable at will from the body, the lower sections being hingedly mounted whereby material from one compartment may travel to an adjacent compartment, the lower section of the partition nearest the end wall of the body having two parts movable in opposite directions about vertical pivots from normally closed aligned end to end relationship with each other to converging relationship upon opposite sides of the discharge opening in the end wall of the body, whereby material in the next to the last compartment may be directed to said parts through the last compartment to said discharge opening.

12. An open top elongated truck body having an end wall provided with a discharge opening, transversely extending partitions within the body at spaced points longitudinally thereof and dividing the same into a series of compartments, each partition having two sections arranged one above the other, the upper sections being relatively fixed but removable at will from the body, the lower sections being hingedly mounted whereby material from one compartment may travel to an adjacent compartment.

13. An open top truck body having side walls, an end wall connected to said side walls and provided with a discharge opening, a partition connected to said side walls in advance of and substantially parallel to said end wall, said partition having normally latched sections adapted when unlatched to move relative to each other toward the end wall for directing material in advance of said partition toward the discharge opening in said end wall.

14. An open top truck body having side walls, an end wall connected to said side walls and provided with a discharge opening, a plurality of partitions connected to said side walls in advance of and substantially parallel to said end wall, the partition nearest the end wall having normally latched sections adapted when unlatched to move relative to each other toward the end wall for directing material in advance of said partition toward the discharge opening in said end wall, the other partitions in advance of the partition just mentioned having normally latched sections adapted when unlatched to move so that material in advance of the respective partitions may move rearwardly toward the sections aforesaid of the first mentioned partition to be directed thereby through the discharge opening in said end wall.

IVIN F. SNYDER.